Figure 1:
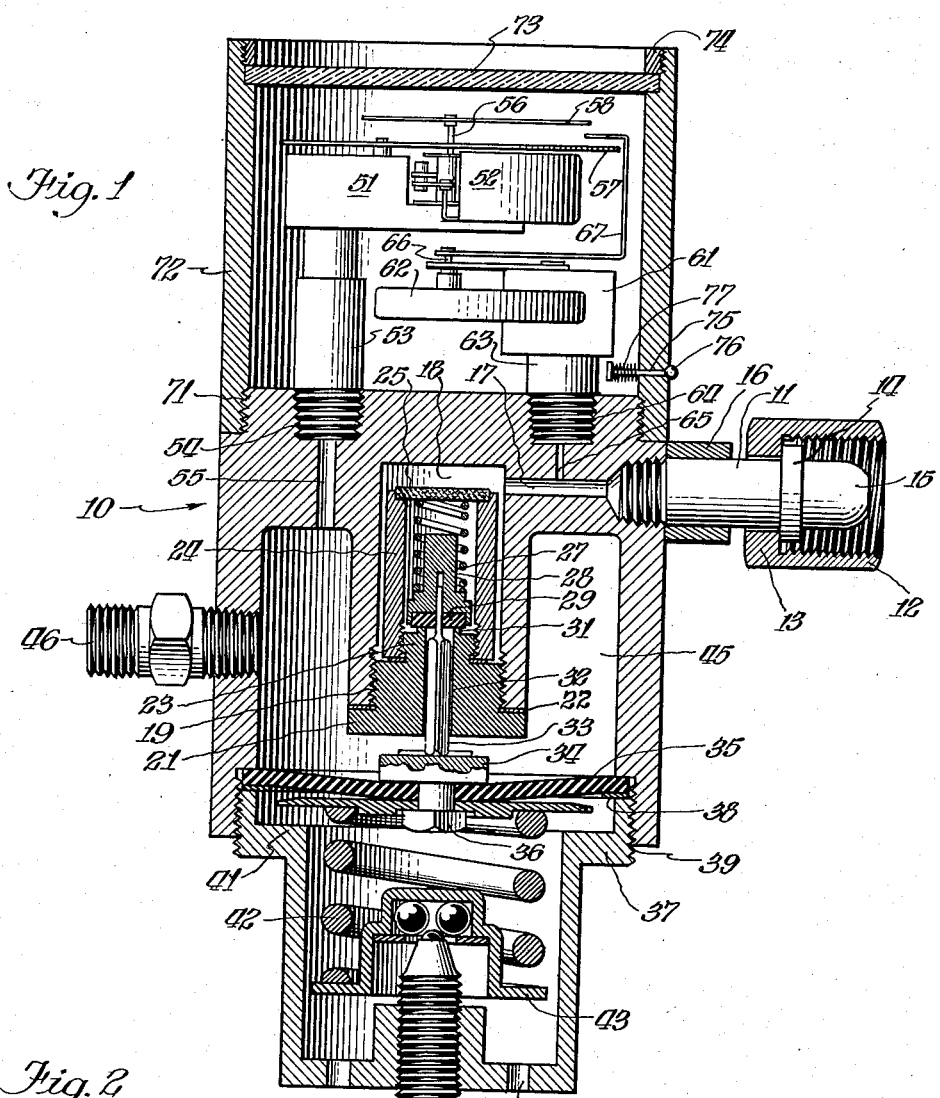

Jan. 19, 1954

J. L. MATASOVIC 2,666,278

PRESSURE REGULATOR

Filed May 25, 1948

Inventor:
John L. Matasovic
By: L. F. Hammand
Attorney.

Patented Jan. 19, 1954

2,666,278

UNITED STATES PATENT OFFICE 2,666,278

PRESSURE REGULATOR

John L. Matasovic, Chicago, Ill.

Application May 25, 1948, Serial No. 29,183

6 Claims. (Cl. 50—23)

1

The present invention relates to pressure regulators and has as its general aim the provision of a novel and improved regulator designed to control the flow of oxygen to welding equipment or the like.

In introduction, it may be noted that the welding art is an old and active one, and that pressure regulators of various types designed to control the supply of gas to equipment of this character are many and varied designs and are in widespread use in every field of industry. It is common knowledge, however, that despite the broad field of use in which equipment of this general character is employed and in spite of the numerous efforts of prior inventors to devise an improved regulator, the present types of mechanisms are inherently faulty, difficult to service, and in many cases even dangerous. In fact, it is all too well known that workmen have quite frequently been killed or seriously injured by mechanical failures of equipment of this type. The causes of such failures are many and varied, but one of the most common causes of injury has arisen from the fact that, in conventional types of equipment, the functional parts have been so related that even a moderate physical impact on the regulator or its pressure gauges could release the explosive force of the compressed gas. In an oxygen pressure regulator this gas is at a pressure of about 2,000 pounds p. s. i., and it follows that if this tremendous pressure is unexpectedly released, it may kill or maim any person working with the equipment.

The applicant is aware that regulators have been designed with a view to minimizing the hazards inherent in conventional equipment, but, so far as is known, those have defeated their own purpose, since they are so inconvenient to use and so difficult to service that the trade prefers to use conventional devices in spite of the risks involved.

It is, accordingly, the primary object of the invention to provide, in a pressure regulator, a novel and improved arrangement of parts whereby several important objects are simultaneously accomplished, so that features giving rise to improved efficiency, dependability and increased convenience in use are achieved in a mechanism which also has inherent advantages from the standpoint of safety and ease of maintenance.

In the present invention, the faults of the prior art devices have been overcome by a novel combination of parts, wherein the danger of accidents is greatly reduced, yet the device is as conveniently used as any present types and, in

2 addition, is much more easily serviced or repaired. More specifically, the present invention contemplates the provision of a pressure regulator designed as a unitary assembly, wherein the high-pressure and low-pressure gauges are nested together, so that they both operate on the same dial, yet are mechanically independent, so that they are individually removable for service without interference with each other. The gauges are protected against accidental impacts by a heavy cylindrical sleeve completely surrounding the gauges and their mounting fittings as well. Dust is excluded from the unit by a transparent lens, but a gas escape port is provided in the sleeve so that even in the event of leakage of the high-pressure gas from the gauge, there is no danger of explosion of the sleeve or lens.

Figure 2:
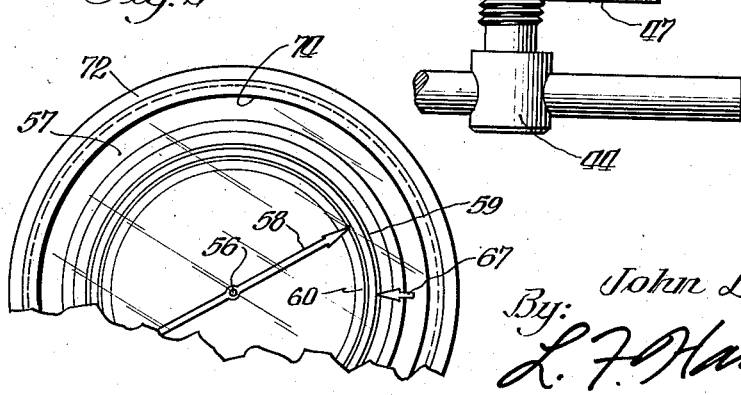

The preferred construction by which the objects of this invention are accomplished is illustrated in the drawing of this specification, wherein:

Figure 1 is a central sectional view through a pressure regulator constructed in accordance with the teachings of this invention; and Figure 2 is a fragmental end view thereof, showing the pressure gauge dial.

The regulator includes a generally cylindrical body portion 10 in which a gas inlet nipple 11 is threaded. The nipple includes a coupling nut 12, having a flange 13 interlocking with the flange 14 of the nipple, so that the hemispherical surface 15 of the nipple may be clamped into gas-tight engagement with a fitting on a compressed gas cylinder. The nipple 11 may be of any suitable material, but it has been found of advantage to utilize stainless steel in place of brass, bronze or other conventional metals, to provide additional strength and freedom from corrosion. In addition, the surface 15 is less apt to be scratched, so that the possibility of gas leakage is reduced. It is also of advantage to provide a spacing collar 16 between the flange 13 and the body of the regulator, so that the threaded coupling nut 12 is limited in its inward movement. The result of this arrangement is that the outer end of the nut is held in a position beyond the spherical surface 15, so that the surface is protected against abrasion when the gauge is removed, replaced or stored.

The inlet nipple 11 supplies high-pressure gas from a source to a bore 17 extending into a central cavity 18 in the regulator. The cavity 18 acts as the high-pressure chamber of the regulator and has internal screw threads 19 at its lower end, and houses a removable subassembly including the high-pressure gas valve and filter.

This subassembly is designed so that the valve seat is completely enclosed by a housing and fine mesh filter, so that the valve seat is effectively protected against dust, and so that the valve and filter parts may be removed from the regulator and replaced as a unit, without exposing the valve seat at any time. To this end the lower end of the cavity 18 is closed by a threaded nozzle 21, sealed by a gasket 22, and having a screw threaded boss 23 on its upper side to receive a cylindrical valve housing 24. The valve housing 24 preferably terminates at the mouth of the gas inlet 17 and is closed at its upper end by a filter 25 which preferably comprises a flat disc of powdered and sintered stainless steel, having a mean pore opening of approximately 65 microns. This disc is conveniently mounted by silver soldering around its marginal edge, so that the disc itself may support the upper end of a small coiled compression spring 27, telescoped over the upper end of the seat assembly 28 on the high-pressure valve seat 29. The valve is arranged to bear against the annular surface 31 of the nozzle to regulate the passage of gas downwardly through the bore 32 in the nozzle 21, but the seating of the valve is controlled by a splined actuating pin 33 having its lower end resting on the top of a bolt 34, secured to the flexible diaphragm 35 by a nut 36.

The diaphragm 35 is of heavy, but resilient, material clamped on to its seat by a threaded spring housing 37 and friction ring 38 and has a rigid backing plate 39 extending outwardly beyond the shoulders 41 in the spring housing to limit the downward movement of the diaphragm. The diaphragm is supported by a coil spring 42, having its lower end carried on a flanged cup 43, the position of which may be manually adjusted by the hand screw 44. The seat 29 controls the flow of gas from the high-pressure chamber 18 through the central opening 32 of the nozzle 21 to the low-pressure chamber 45, from which gas is delivered through the outlet fitting 46. The spring housing 37 is vented at 47 so that the diaphragm functions to balance the pressure in the chamber 45 against atmospheric pressure and the forces of the spring 42.

The regulator includes a pair of pressure gauges for the high-pressure chamber 18 and the low-pressure chamber 45. The lower pressure gauge is of offset or L-shaped form, including a body portion 51 on which the Bourdon tube 52 and other working parts are mounted, with a threaded nipple 53 fitted in a tapped opening 54 in the end of the body 10 of the regulator. The gauge communicates with the low-pressure chamber 45 through the port 55. The needle post 56 of the gauge is in alignment with the axis of the body portion 10 of the regulator and a circular dial 57 is provided on which the low-pressure needle registers, to give an indication of the working pressure of the gas being delivered through the outlet port 46.

The regulator also includes a high-pressure gauge 52 having a squared body 61 on which the Bourdon tube 62 and other operating parts are mounted. This gauge also is mounted on a nipple 63 threaded in the tapped opening 64 in the upper end of the housing 10, and connected to the high-pressure gas chamber by the port 65. This gauge includes a needle post 66 which, in the preferred construction, is concentric with the post 56 of the low-pressure gauge, but is located between the body 51 of the low-pressure gauge and the end of the housing 10, so that an offset indicating needle 67, carried by the post 66, may extend outwardly and upwardly around the edge of the dial 57 whereby both the high-pressure and low-pressure gauges may register on concentric scales 59 and 60 on the same dial face.

The upper end of the regulator housing 10 is threaded at 71 to receive a cylindrical sleeve 72, surrounding the gauges and dial. The sleeve is closed at its upper end by a transparent lens 73, which may be of glass or transparent plastic material and is conveniently held in place by the threaded ring 74. The sleeve 72 is of heavy, rugged construction so that it protects both gauges and their mounting nipples against accidental impacts.

It is to be noted, however, that it clears the dial 57 so that the needle 67 may function without interference and also that it is removably mounted on the regulator at a point well below the body portions 51 and 61 of the gauges. Thus, although the gauges are completely protected in use, they are also perfectly accessible, and when the sleeve 72 is removed, both gauges are fully exposed for inspection or repair.

The sleeve 72 has a gas relief aperture 75 drilled through its side wall, so that if a gas leak should develop in one of the gauges, the gas would escape before a dangerous pressure is built up within the sleeve. A headed pin 76 is positioned in the aperture, however, and held in place by a compression spring 77, so that dust or foreign material is effectively excluded.

In operation, several important advantages are achieved over the types of regulators heretofore known. It has been mentioned that the provision of the stainless steel nipple 11 and sleeve 16 not only reduces the liability of breakage of the nipple but also protects the coupling surfaces 15 of the nipple and thus reduces the possibility of gas leakage.

Important advantages are brought about by the provision of the unitary subassembly for the high-pressure valve and filter since it will be noted that even when the entire unit is removed from the regulator, the filter 25 acts as an effective dust seal for the unit, preventing any foreign material from reaching the valve seat. When the subassembly is in place, it coacts with the walls of the cavity 17 to act as a dust separator, so that foreign material introduced accidentally through the inlet port 17 will have little tendency to interfere with the proper functioning of the mechanism. This is because the high-pressure gas, flowing inwardly from the port 17, flows directly across the surface of the filter at high velocity. Any foreign matter that may have become lodged on the filter surface is blown off, and the swirling action of the gas within the chamber 18 will naturally act to deposit the dust or foreign material in the deep, narrow, annular crevice between the outside of the sleeve 24 and the inside of the cavity 18. Since the filter and high-pressure valve are removable and replaceable as a unit, any regulator found to be faulty in operation may be repaired on the job by merely replacing the subassembly without the need of exposing the valve seat at any time. This is an important advantage from a practical standpoint, because experience has shown that even almost microscopic particles of foreign matter which lodge on the valve seat may interfere with the proper functioning of the valve, and when repair in the field is attempted, it is a common experience to have perfect replacement parts fail to operate properly, due to the fact that, although the parts were clean to begin with, some specks of dust have found their way into the mechanism as the unit is reassembled.

An even more important advantage of the present invention over the art arises from the fact that the inherently dangerous construction of conventional regulators is avoided, yet even greater convenience of operation is achieved. The high and low-pressure gauges are concentric with each other and operate on the same dial, yet each is physically independent of the other, so that either may be unscrewed and removed from the unit for inspection, repair or replacement without disturbing the other. The threaded sleeve 72 surrounds both of the gauges and thus precludes any possibility of accidentally striking the gauges in a manner that might crack or weaken the gauges themselves or the mounting nipples. Thus, one of the principal causes of failure and physical injury inherent in prior art devices is overcome, yet at the same time the fact that the sleeve is threaded to the body at a point well below the head portions of either gauge makes them completely accessible, so that they may be removed or replaced by the utilization of the usual wrenches and without the necessity of any specially designed tools. The sleeve and lens serve to protect the structure of the gauges and exclude dust from their mechanism without interfering with the visibility of the dial, and the gas escape aperture prevents any possibility of explosion of the device in the event that a defective gauge should permit high-pressure gas to leak into the inside of the gauge chamber.

From the foregoing, it will be apparent that the teachings of this invention accomplish several important advances over the prior art, since the present device is not only of such design and construction that the possibility of injury to bystanders by reason of mechanical failure of the component parts of the regulator is materially reduced, but, in addition, a regulator in accordance with the present teachings is more efficient and less likely to be damaged by careless use, and is more susceptible to quick, easy and successful repair in the field.

The form of the invention illustrated and described herein is the preferred embodiment of these teachings. It is shown as an illustration of the inventive concept, however, rather than by way of limitation, since it is recognized that various modifications and variations of structure may be indulged in without departing from the scope of the appended claims.

Having thus described the invention, what I claim as new and desire to protect by United States Letters Patent is:

1. In a pressure regulator, the combination of an inlet passage and a high-pressure chamber comprising a generally cylindrical cavity having one closed end and screw threads adjacent the open end; a threaded nozzle fitted to said screw threads to close the chamber; said nozzle including a central gas passage and a central male screw portion projecting into the cavity, said screw portion being an integral part of the nozzle and having an annular valve seating surface surrounding the gas passage; together with a valve housing of generally cylindrical shape threaded to the screw portion of the plug at one end and closed by a filter disc of porous metal at the inner end; said housing fitting closely within the cavity of the high-pressure chamber but spaced therefrom to provide a narrow annular crevice adapted to receive any particles of dust introduced into the chamber.

2. In a pressure regulator, in combination, a housing having a low pressure chamber and a high pressure chamber comprising a generally cylindrical cavity with a wide mouth opening into the low pressure chamber; a bodily removable valve and filter assembly extending into the high pressure chamber from the low pressure chamber; said assembly including sealing means having an enlarged head positioned within the low pressure chamber; a valve nozzle on said head and extending into the high pressure cavity, a valve seat thereon, and a valve housing mounted on and affixed to the nozzle and enclosing the valve seat; said housing having exterior surfaces lying in close proximity to the inside surfaces of the high pressure chamber to provide a narrow dust chamber therebetween; the exterior surfaces of said valve housing being smooth and uninterrupted throughout and including a porous filter portion; together with an inlet passage to the high pressure chamber directed laterally across said filter portion to dislodge dust therefrom.

3. In a pressure regulator, in combination, a housing having a low pressure chamber and a high pressure chamber comprising a generally cylindrical cavity with a wide mouth opening into the low pressure chamber; a bodily removable valve and filter assembly extending into the high pressure chamber from the low pressure chamber; said assembly including sealing means having and enlarged head positioned within the low pressure chamber; a valve nozzle on said head and extending into the high pressure cavity, a valve seat thereon, and a valve housing mounted on and affixed to the nozzle and enclosing the valve seat; said housing having exterior surfaces lying in close proximity to the inside surfaces of the high pressure chamber to provide a narrow dust chamber therebetween.

4. In a pressure regulator, in combination, a housing having a low pressure chamber and a high pressure chamber comprising a generally cylindrical cavity with a wide mouth opening into the low pressure chamber; a bodily removable valve and filter assembly extending into the high pressure chamber from the low pressure chamber; said assembly including sealing means having an enlarged head positioned within the low pressure chamber; a valve nozzle on said head and extending into the high pressure cavity, a valve seat thereon, and a valve housing mounted on and affixed to the nozzle and enclosing the valve seat; the exterior surfaces of said valve housing being smooth and uninterrupted throughout and including a porous filter portion; together with an inlet passage to the high pressure chamber directed laterally across said filter portion to dislodge dust therefrom.

5. In a pressure regulator, the combination of a high pressure chamber comprising a generally cylindrical cavity with a wide mouth opening, and a bodily removable valve and filter assembly extending into the high pressure chamber; said assembly including sealing means having an enlarged head and a valve nozzle on said head and extending into the high pressure cavity, a valve seat thereon, and a valve housing mounted on and affixed to the nozzle and enclosing the valve seat; said housing having exterior surfaces including a porous filter portion; said exterior surfaces of said valve housing being smooth and uninterrupted throughout; together with an inlet passage to the high pressure chamber directed laterally across said filter portion to dislodge dust therefrom.

6. In a pressure regulator having a high pressure chamber with an inlet thereto; a low pressure chamber having a diaphragm therein and an outlet therefrom, and a wide mouth opening between said chambers, the subcombination of a valve assembly comprising a single self-contained removable unit; said unit comprising a screw threaded nozzle between said high pressure chamber and said low pressure chamber; said nozzle separating the high pressure and low pressure chambers from each other but having a central bore affording a gas passage therethrough; with an annular sealing surface on said nozzle encircling said bore, and screw threaded means on said nozzle supporting a tubular valve housing affixed to and supported wholly by said screw threaded means; said housing comprising a protective cap enclosing one end of the gas passage extending through said nozzle and completely surrounding said annular sealing surface; together with a valve seat within the housing and bearing on the annular sealing surface of the nozzle to close the gas passage therethrough, and means for urging said valve seat against said sealing surface; whereby the entire valve assembly may be removed and replaced as a unit without exposing the annular sealing surface of the gas passage or the valve seat thereon.

JOHN L. MATASOVIC.

References Cited in the file of this patent

UNITED STATES PATENTS

| Number | Name | Date |
| --- | --- | --- |
| 1,210,891 | Blanchard | Jan. 2, 1917 |
| 1,659,918 | Lipman | Feb. 21, 1928 |
| 1,674,879 | Atkinson | June 26, 1928 |
| 2,103,576 | Dockson | Dec. 28, 1937 |
| 2,108,272 | Seyforth | Feb. 15, 1938 |
| 2,237,940 | Koenig | Apr. 8, 1941 |
| 2,318,721 | Siver | May 11, 1943 |
| 2,518,852 | Annin | Aug. 15, 1950 |